(12) United States Patent
Pollock et al.

(10) Patent No.: US 11,405,687 B1
(45) Date of Patent: Aug. 2, 2022

(54) SYSTEMS AND METHODS FOR CONTROLLING TRANSMISSION OF LIVE MEDIA STREAMS

(71) Applicant: Shopify Inc., Ottawa (CA)

(72) Inventors: Corey Pollock, Toronto (CA); John Jong-Suk Lee, Waterloo (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/237,153

(22) Filed: Apr. 22, 2021

(51) Int. Cl.
H04N 21/442 (2011.01)
H04N 21/2187 (2011.01)
G06Q 30/02 (2012.01)
G06V 20/40 (2022.01)

(52) U.S. Cl.
CPC ... *H04N 21/44222* (2013.01); *G06Q 30/0211* (2013.01); *G06V 20/40* (2022.01); *H04N 21/2187* (2013.01)

(58) Field of Classification Search
CPC ......... H04N 21/44222; H04N 21/2187; G06K 9/00711; G06Q 30/0211
USPC .......................................................... 725/14
See application file for complete search history.

(56) References Cited

U.S. PATENT DOCUMENTS

| | | | |
|---|---|---|---|
| 10,021,458 B1* | 7/2018 | Taylor ................ | H04N 21/2187 |
| 10,943,125 B1* | 3/2021 | Evans ................ | G06K 9/00724 |
| 2003/0022622 A1* | 1/2003 | Weinblatt ............... | H04H 20/93 455/3.06 |
| 2007/0022447 A1* | 1/2007 | Arseneau ............... | H04H 20/72 725/74 |
| 2018/0005272 A1* | 1/2018 | Todasco ............. | G06K 9/00302 |

* cited by examiner

*Primary Examiner* — Nnenna N Ekpo
(74) *Attorney, Agent, or Firm* — Rowand LLP

(57) ABSTRACT

A computer-implemented is disclosed. The method includes: receiving video data of a live media stream; obtaining, while the live media stream is being streamed, audience reaction data associated with the live media stream, the audience reaction data indicating, at least, an amount of audience engagement activity in connection with video content of the live media stream; identifying an event-of-interest in the live media stream based on a determination that a rate of change of the amount of audience engagement activity exceeds a threshold level; and in response to identifying the event-of-interest, automatically initiating one or more defined actions.

20 Claims, 13 Drawing Sheets

114

E-Commerce Platform | Q Search | JG John's Apparel / Jonny B. Good

- Home
- Orders
- Products
- Customers
- Reports
- Discounts
- Apps

SALES CHANNELS
- Online Store
- Mobile App

View all channels

Settings

Good afternoon, Jonny B..
Here's what's happening with your store today.

Today's total sales    Today's visits
$98.00                 1

- Update your Platform Payments tax details
  We require additional information to verify your identity.
  [Update tax details]

- Advanced Cash on Delivery has been deactivated for your store
  [See why]

All channels ▾    Today ▾

TOTAL SALES
$98.00

$125
$75
$25
         12am      8pm      4pm    11pm
                                    Jun 1
                                    2 orders TOTAL SALES BY CHANNEL    View dashboard
                          Jun 1
Online Store              0 orders
$0.00

Mobile app
$0.00                     0 orders

Shopify POS (126 York St.)
$0.00                     0 orders

FIG. 3

SYSTEMS AND METHODS FOR CONTROLLING TRANSMISSION OF LIVE MEDIA STREAMS

FIELD

The present disclosure relates to media streaming technologies and, in particular, to systems and methods for controlling transmission of live media streams.

BACKGROUND

Livestreaming is a popular form of broadcasting content to online audiences. A wide variety of content, such as social media, interactive gameplay, and coverage of sporting events, may be recorded and broadcast using a livestream service. Conventional livestreaming systems distribute content to viewers in a one-to-many model—a broadcaster creates a single stream of media content that is transmitted to multiple viewers.

BRIEF DESCRIPTION OF THE DRAWINGS

Embodiments will be described, by way of example only, with reference to the accompanying figures wherein:

FIG. 3 is an example of a home page of an administrator, in accordance with an example embodiment;

DETAILED DESCRIPTION OF EMBODIMENTS

Figure 1A:
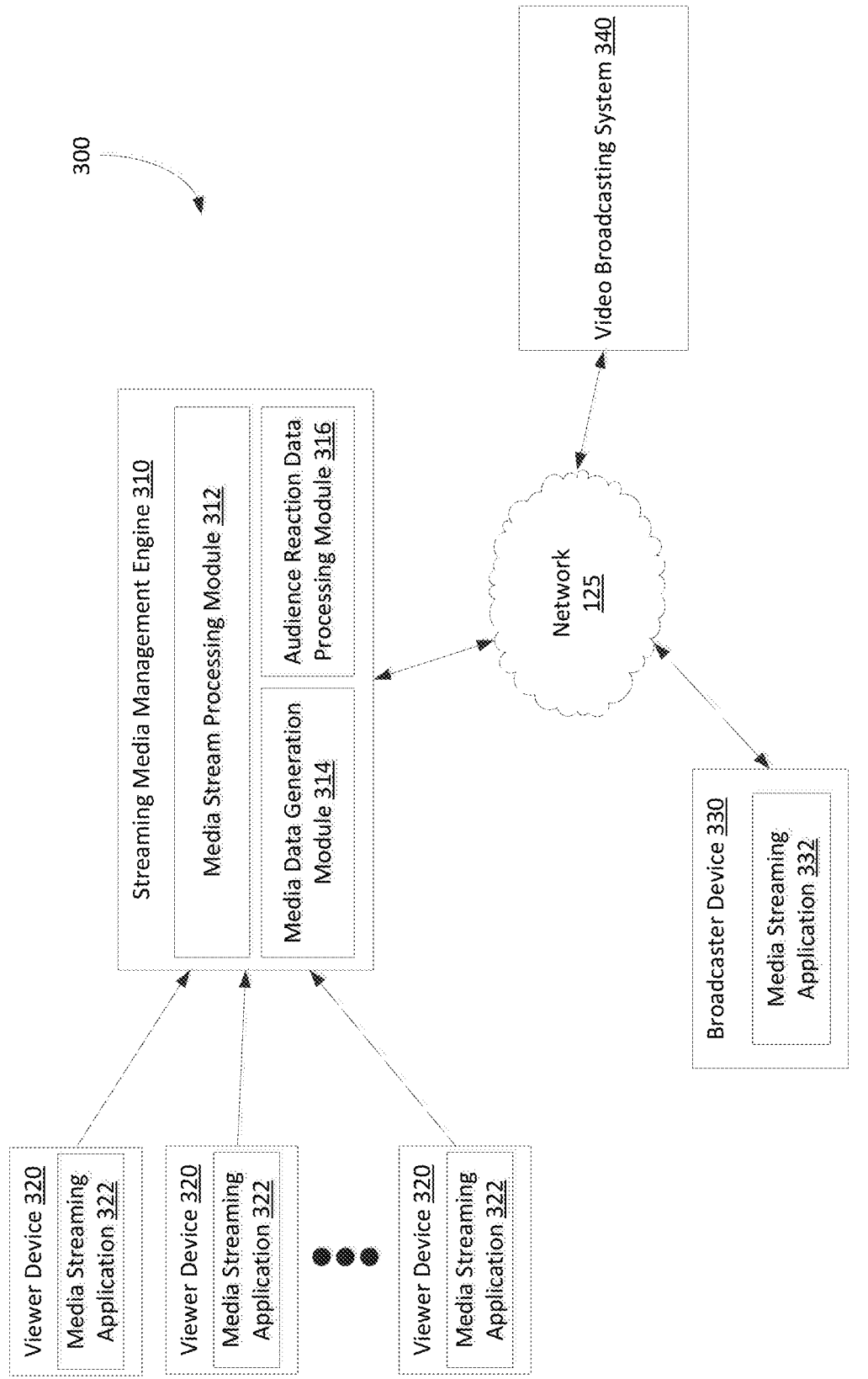
FIG. 1A illustrates an example system for processing live media streams, including a streaming media management engine.

Livestreaming is a popular form of distributing media content to large audiences. A wide variety of content, such as social media, interactive gameplay, and news coverage, may be recorded and broadcast using a livestream service. Other examples of live streams include scheduled events such as concerts, sporting events, and product promotions. A live stream may be initiated by a broadcaster, either spontaneously or in accordance with a defined schedule. (The terms "broadcaster", "streamer", "stream creator" and "host" are used interchangeably in this disclosure to refer to an entity that broadcasts content via a live media stream.) Livestreaming comprises a one-way broadcast of content and generally requires source media (e.g., video camera, audio interface, etc.), encoders to digitize the content, a media publisher entity, and a content delivery network for distributing the content to viewers.

Various platforms that support live streaming services enable interaction by viewers of the live streams. In particular, viewers may be enabled to interact with the broadcaster and/or other viewers of a live stream. For example, a live streaming platform may provide a user interface for a chat room in which one or more viewers of a live stream can participate. Viewers may communicate with each other or the broadcaster by inputting comments, emojis, etc. during a live stream. Viewers may also indicate their reactions to the content of a live stream by, for example, selecting one or more user interface elements (e.g., emotive icons) corresponding to their emotional responses in relation to the streamed content.

Conventional livestreaming solutions do not provide adequate support for broadcasters in controlling transmission of their streams. During a live stream, broadcasters are typically occupied with content creation, and may not be able to closely scrutinize stream analytics, audience reactions, and the like. As a consequence, broadcasters may often lack signals or feedback on whether the audience is actually engaging with the live media stream. In many cases, broadcasters may have incentives (e.g., subscriptions, donations, etc.) for creating content that is responsive to viewer reactions and sentiments. In particular, it is desirable to provide broadcasters with tools for content management that leverages audience reaction data for a live media stream.

In an aspect, the present application discloses a computer-implemented method. The method includes: receiving video data of a live media stream; obtaining, while the live media stream is being streamed, audience reaction data associated with the live media stream, the audience reaction data indicating, at least, an amount of audience engagement activity in connection with video content of the live media stream; identifying an event-of-interest in the live media stream based on a determination that a rate of change of the amount of audience engagement activity exceeds a threshold level; and in response to identifying the event-of-interest, automatically initiating one or more defined actions.

In some implementations, the audience reaction data may include user input obtained via computing devices associated with viewers of the live media stream.

In some implementations, the user input may include at least one of text input or selection of defined user interface elements associated with the live media stream.

In some implementations, the amount of audience engagement activity may be determined based on a quantity of the user input.

In some implementations, obtaining audience reaction data may include determining that the audience reaction data is non-negative reaction data.

In some implementations, obtaining the commerce data may include obtaining product preference data of an e-commerce account associated with the viewer.

In some implementations, obtaining audience reaction data may include: receiving audience reaction input; filtering the audience reaction input to exclude negative audience reaction input to produce the audience reaction data; and determining the amount of audience engagement activity from the audience reaction data.

In some implementations, automatically initiating the one or more defined actions may include: generating an offer of a product discount in connection with a defined product; and providing the generated offer to at least a subset of viewers of the live media stream.

In some implementations, generating an offer may further include determining that the event-of-interest relates to the defined product.

In some implementations, automatically initiating the one or more defined actions may include providing one or more digital assets in connection with the live media stream to at least one of: a subset of viewers of the live media stream; or a stream creator associated with the live media stream.

In some implementations, automatically initiating the one or more defined actions may include prompting at least a subset of viewers of the live media stream for input in connection with the live media stream.

In another aspect, the present application discloses a computing system. The computing system includes a processor and a memory storing computer-executable instructions that, when executed, are to cause the processor to: receive video data of a live media stream; obtain, while the live media stream is being streamed, audience reaction data associated with the live media stream, the audience reaction data indicating, at least, an amount of audience engagement activity in connection with video content of the live media stream; identify an event-of-interest in the live media stream based on a determination that a rate of change of the amount of audience engagement activity exceeds a threshold level; and in response to identifying the event-of-interest, automatically initiating one or more defined actions.

In another aspect, the present application discloses a computer-implemented method. The method includes: receiving media data of a live media stream; obtaining audience reaction data associated with the live media stream; identifying an event-of-interest in the live media stream based on the audience reaction data, wherein a time of the event-of-interest is prior to a time of the audience reaction data; obtaining a segment of at least one of audio data or video data of the live media stream that is associated with the time of the event-of-interest; generating a digital asset incorporating the segment; and providing the digital asset to at least one viewer of the live media stream.

In some implementations, the segment may include at least one of audio capture data or video frame capture data from the media data that is associated with the time of the event-of-interest.

In some implementations, the digital asset may include a product offer that includes a product having the at least one of audio capture data or video frame capture data applied thereto.

In some implementations, the product may include one of: an article of clothing, a household item, or a promotional item.

In some implementations, the digital asset may include an electronic product incorporating the at least one of audio capture data or video frame capture data.

In some implementations, the electronic product may include a customizable graphics interchange format (GIF) image.

In some implementations, the digital asset may include a plurality of segments of audio or video data, each of the plurality of segments corresponding to a respective event-of-interest.

In some implementations, the segment may include a video clip from the video data that is associated with the time of the event-of-interest.

In some implementations, generating the digital asset may include generating display data associated with the digital asset and providing the digital asset may include providing the generated display data as overlay content for the live media stream.

In some implementations, the method may further include providing an indication of the digital asset to a stream creator associated with the live media stream.

In some implementations, providing the indication of the digital asset to the stream creator may include prompting the stream creator to approve the digital asset prior to providing the digital asset to the at least one viewer of the live media stream.

In another aspect, the present application discloses a computing system. The computing system includes a processor and a memory storing computer-executable instructions that, when executed, are to cause the processor to: receive media data of a live media stream; obtain audience reaction data associated with the live media stream; identify an event-of-interest in the live media stream based on the audience reaction data, wherein a time of the event-of-interest is prior to a time of the audience reaction data; obtain a segment of at least one of audio data or video data of the live media stream that is associated with the time of the event-of-interest; generate a digital asset incorporating the segment; and provide the digital asset to at least one viewer of the live media stream.

In another aspect, the present application discloses a computer-implemented method. The method includes: receiving media data of a live media stream; detecting a trigger associated with the media data of the live media stream; in response to detecting the trigger, generating at least one of audio or video overlay content associated with the trigger; and transmitting, to viewer devices, the at least one of audio or video overlay content with the live media stream.

In some implementations, detecting the trigger associated with the media data may include detecting one or more defined keywords in audio data of the live media stream.

In some implementations, the method may further include first determining the one or more defined keywords.

In some implementations, determining the one or more defined keywords may include retrieving, from memory, creator-specified keyword data identifying the one or more defined keywords.

In some implementations, determining the one or more defined keywords comprises: during previous media streams involving a stream creator, detecting a greater-than-threshold acceleration of audience reaction during display of a media stream; identifying a trigger time within the media stream associated with the greater-than-threshold acceleration of audience reaction; and identifying utterance of the one or more defined keywords at the trigger time.

In some implementations, detecting the trigger associated with the media data may include detecting a defined gesture in video data of the live media stream.

In some implementations, the method may further include: identifying an event-of-interest based on audience reaction data associated with the live media stream; and providing, to a stream creator associated with the live media stream, an indication of the identified event of interest and one or more suggested words associated with the identified event of interest, and detecting the trigger associated with the media data may include detecting at least one of the suggested words associated with the identified event of interest in audio data of the live media stream.

In some implementations, detecting the trigger may include determining that the content of the live media stream relates to a particular product and generating the at least one of audio or video overlay content may include generating media content relating to the particular product.

In some implementations, determining that the content of the live media stream relates to the particular product may include determining that the live media stream is associated with a product tag corresponding to the particular product.

In some implementations, determining that the content of the live media stream relates to the particular product may include detecting the particular product in video data of the live media stream.

In another aspect, the present application discloses a computing system. The computing system includes a processor and a memory storing computer-executable instructions that, when executed, are to cause the processor to: receive media data of a live media stream; detect a trigger associated with the media data of the live media stream; in response to detecting the trigger, generate at least one of audio or video overlay content associated with the trigger; and transmit, to viewer devices, the at least one of audio or video overlay content with the live media stream.

In another aspect, the present application discloses a non-transitory, computer-readable medium storing computer-executable instructions that, when executed by a processor, are to cause the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extendible by connecting one or more additional sales channels representing platforms where products can be sold. In particular, the sales channels may themselves be e-commerce platforms, such as Facebook Shops™, Amazon™, etc.

Live Media Streaming

The present application discloses solutions for addressing some of the aforementioned technical limitations of conventional livestreaming systems. The proposed system is designed to automatically identify events-of-interest in a live media stream based on audience reaction data. More specifically, the system processes audience reaction data associated with a live media stream and identifies events-of-interest based on changes in metrics for gauging audience reaction. Upon identifying events-of-interest, the system may automatically initiate one or more defined actions in connection with the live media stream. In particular, the detection of events-of-interest may allow broadcasters to better control the content (i.e., media data) that is created for delivery to viewers.

Reference is now made to FIG. 1A, which illustrates, in block diagram form, an example system 300 for processing live media streams. As shown in FIG. 1A, the system 300 may include viewer devices 320, broadcaster devices 330, a video broadcasting system 340, and a network 125 connecting one or more of the components of system 300.

As illustrated, the viewer devices 320 and the broadcaster device 330 communicate via the network 125. In at least some embodiments, each of the viewer devices 320 and the broadcaster device 330 may be a computing device. The viewer devices 320 and the broadcaster device 330 may take a variety of forms including, for example, a mobile communication device such as a smartphone, a tablet computer, a wearable computer (such as a head-mounted display or smartwatch), a laptop or desktop computer, or a computing device of another type.

The broadcaster device 330 is associated with a broadcaster. In particular, the broadcaster device 330 enables a broadcaster to initiate streaming of media content to one or more viewers. In at least some embodiments, the broadcaster device 330 may have resident thereon a media streaming application 332. The media streaming application 332 may be a standalone application (e.g., a mobile app) or a web-based application. A broadcaster can launch the media streaming application 332 on the broadcaster device 330 and initiate a live media (e.g., audio, video, etc.) stream. The live video stream may be transmitted directly to viewer devices 320. Alternatively, the live video stream may be transmitted to an intermediary video broadcasting system 340. In some embodiments, the video broadcasting system 340 may be a social networking system, and the media streaming application 332 may be a social networking application for gaining access to a social network. The broadcaster device 330 may communicate with servers of the video broadcasting system 340 via the media streaming application 332. The video broadcasting system 340 may, in turn, transmit the live video stream to viewer devices 320. The media streaming application 332 may include various monitoring and management functionalities involved in producing a live video stream. By way of example, the broadcaster may control transmission settings for a live video stream, manage viewer permissions, and monitor audience reactions using the media streaming application 332.

The viewer devices 320 are associated with viewers of a live video stream. Viewers may access a live video stream using a media streaming application 322, which may be standalone application or a web-based application. For example, live video streams may be viewed using a web browser, a social networking application, a media playback application, or the like. Viewer devices 320 may communicate directly with the broadcaster device 330, or they may communicate with servers of a video broadcasting system 340.

The video broadcasting system 340 provides a platform for sharing content by means of streams of video data, including live video streams. The video broadcasting system 340 may comprise servers that are configured to receive and transmit live media streams. In at least some embodiments, the video broadcasting system 340 may be a social networking system. In particular, the video broadcasting system 340 may be a computing system that can host an online social network. Users may access the social network to broadcast content to other users or to view content that is steamed by other users. For example, the video broadcasting system 340 may provide a website or software (e.g., a social media app) that enables users to initiate or view a live video stream. The video broadcasting system 340 receives digitally encoded data representing live video streams from broadcaster devices 330, and viewer devices 320 access servers of the video broadcasting system 340 to receive transmission of the encoded video stream data.

A streaming media management engine 310 is provided in the system 300. The streaming media management engine 310 may be a software-implemented module containing processor-executable instructions that, when executed by one or more processors, cause a computing system to carry out some of the processes and functions described herein. In some embodiments, the streaming media management engine 310 may be provided as a stand-alone service. In particular, a computing system may engage the streaming media management engine 310 as a service that facilitates processing of live video streams.

The streaming media management engine 310 is configured to receive audio and video data for live video streams. In particular, the streaming media management engine 310 may be communicably connected to one or more broadcaster devices 330. For example, the broadcaster devices 330 may transmit live video stream data directly to the streaming media management engine 310, or live video stream data may be received at the streaming media management engine 310 via an intermediary system, such as the video broadcasting system 340.

In accordance with one or more disclosed embodiments, the streaming media management engine 310 may facilitate customization of live video streams for individual viewers. For example, the streaming media management engine 310 may transmit modified versions of an original live video stream to viewer devices. That is, the media (e.g., audio, video, etc.) data of the live video stream may be modified by the streaming media management engine 310 prior to transmission to viewers. Additionally, or alternatively, the streaming media management engine 310 may transmit the original stream with instructions on how to modify the stream on the client-side (i.e., at the viewer device) prior to presenting the stream to a viewer. By way of example, the streaming media management engine 310 may be configured to provide personalized overlay content that is transmitted with an original live video stream to viewer devices.

The streaming media management engine 310 includes a media stream processing module 312. The media stream processing module 312 performs operations for processing the media data associated with live streams. The media stream processing module 312 receives live video feed from various sources (e.g., video mixers, broadcaster devices, etc.). The live video feed may be in a compressed or uncompressed format. The media stream processing module 312 may supply the live video feed to a plurality of video encoders that compress the live video feed using one or more codecs (e.g., MPEG-2, H. 264, etc.).

The media stream processing module 312 may perform analysis of the media content associated with a live video feed. In some embodiments, the media stream processing module 312 may perform object detection in the live video stream. In particular, the media stream processing module 312 may implement detection of objects (e.g., persons, physical objects, etc.) and associated features and actions, in real-time, based on analysis of audio and/or video data of the live video stream. For example, the media stream processing module 312 may be configured to detect gestures and uttered keywords of subjects that are featured in a live video stream.

In some embodiments, the media stream processing module 312 may capture segments of audio or video data from the live video stream. By way of example, the media stream processing module 312 may identify significant portions of a live video stream and capture audio and/or video segments that are associated with the identified portions. The segments for capture may be determined based on input from broadcaster and/or viewer devices (e.g., timestamp markers indicating highlights of a live video stream) or based on various defined rules for media capture, some of which will be described in greater detail below.

The streaming media management engine 310 also includes a media generation module 314. The media generation module 314 is configured to generate audio or image/video data as overlay content for a live video stream. For example, the media generation module 314 may generate replacement graphics or audio that may be used to overlay at least a portion of the live video stream. In particular, the overlay content that is generated by the media generation module may be presented with the original stream of a live video stream.

The streaming media management engine 310 also includes an audience engagement processing module 316. The audience engagement processing module 316 is configured to collect audience engagement data, which may viewer statistics (e.g., number of viewers, number of units of a featured product added to shopping lists, demographic information of viewers) and audience reactions data (e.g., types, number, timing, and frequency of reactions to content). The audience reactions data may include, for example, analytics relating to emotional reactions of viewers to the content of a live video stream. The emotional reactions may include expressions of viewer responses to the content, such as "like", "celebrate", "love", "care", "sad", "angry", "curious", and the like.

The streaming media management engine 310, the viewer devices 320, the broadcaster device 330, and the video broadcasting system 340 may be in geographically disparate locations. Put differently, the viewer devices 320 may be remote from one or more of: streaming media management engine 310, the broadcaster device 330, and the video broadcasting system 340. As described above, the viewer devices 320, the broadcaster device 330, the streaming media management engine 310, and the video broadcasting system 340 may be computing systems.

The network 125 is a computer network. In some embodiments, the network 125 may be an internetwork such as may be formed of one or more interconnected computer networks. For example, the network 125 may be or may include an Ethernet network, an asynchronous transfer mode (ATM) network, a wireless network, or the like.

In some example embodiments, the streaming media management engine 310 may be integrated as a component of an e-commerce platform. That is, an e-commerce platform may be configured to implement example embodiments of the streaming media management engine 310. More particularly, the subject matter of the present application, including example methods for controlling transmission of live media streams disclosed herein, may be employed in the specific context of e-commerce.

Figure 1B:
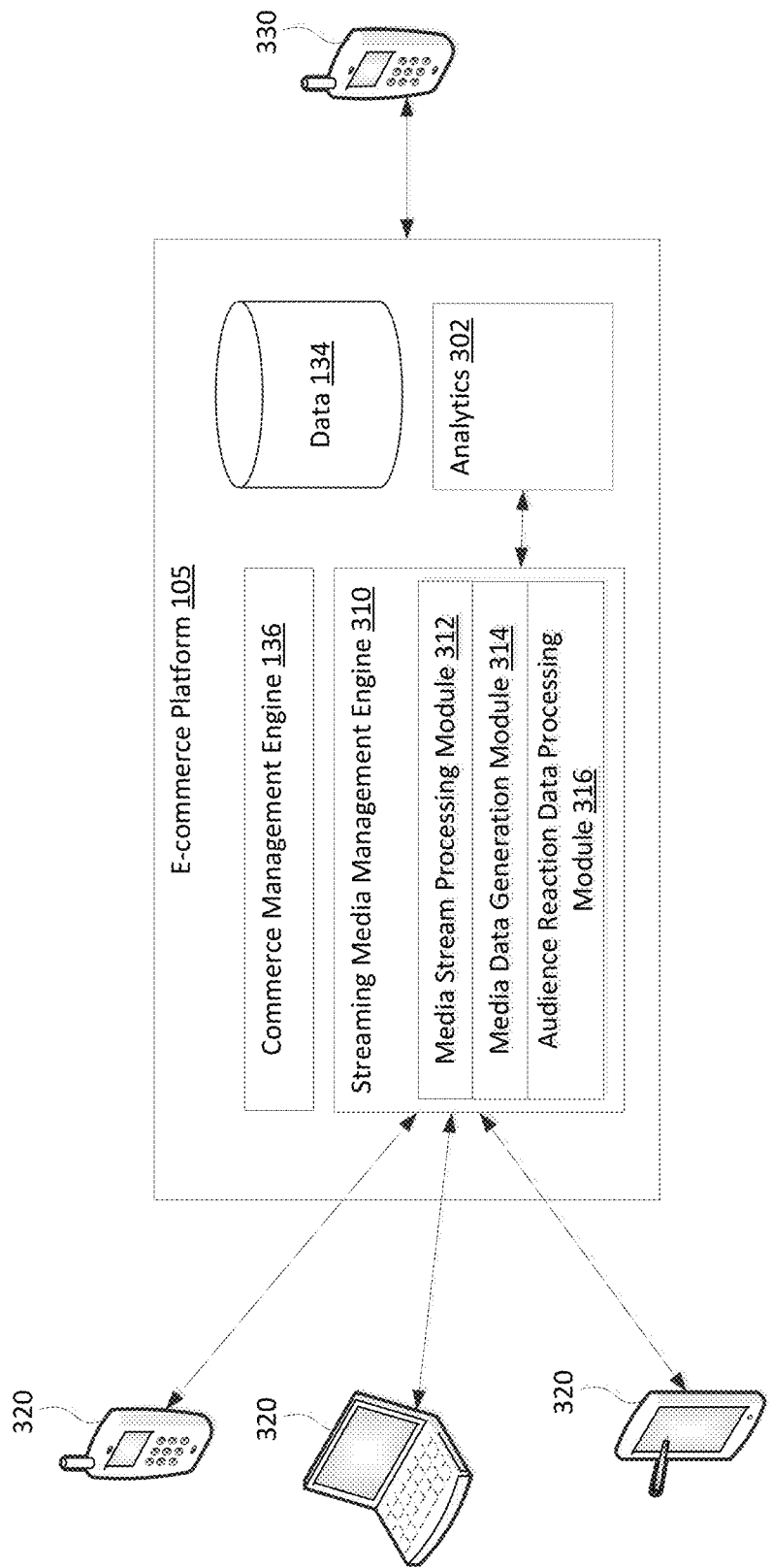
FIG. 1B is a block diagram of an e-commerce platform that is configured for implementing example embodiments of the streaming media management engine of FIG. 1A.

Reference is made to FIG. 1B which illustrates an example embodiment of an e-commerce platform 105 that implements a streaming media management engine 310. The viewer devices 320 and the broadcaster device 330 may be communicably connected to the e-commerce platform 105. In at least some embodiments, the viewer devices 320 and the broadcaster device 330 may be associated with accounts of the e-commerce platform 105. More specifically, the viewer devices 320 and the broadcaster device 330 may be associated with entities (e.g., individuals) that have accounts in connection with the e-commerce platform 105. For example, one or more viewer devices 320 and broadcaster devices 330 may be associated with customers (e.g., customers having e-commerce accounts) or merchants having one or more online stores in the e-commerce platform 105. The e-commerce platform 105 may store indications of associations between viewer/broadcaster devices and merchants or customers of the e-commerce platform, for example, in the data facility 134.

In at least some embodiments, the e-commerce platform 105 may provide a processing facility for streaming media. The e-commerce platform 105 may be leveraged in order to provide viewers of live video streams with customized content that is relevant for the viewers. More particularly, components of the e-commerce platform 105 may be configured to provide customized streams containing product variant information that is personalized for individual viewers of a live video stream.

The e-commerce platform 105 includes a commerce management engine 136, a streaming media management engine 310, a data facility 134, and a data store 302 for analytics relating to streaming media. The commerce management engine 136 may be configured to handle various operations in connection with e-commerce accounts that are associated with the e-commerce platform 105. For example, the commerce management engine 136 may be configured to retrieve e-commerce account information for various entities (e.g., merchants, customers, etc.) and historical account data, such as transaction events data, browsing history data, and the like, for selected e-commerce accounts. In particular, the commerce management engine 136 may obtain account information for e-commerce accounts of viewers and/or broadcasters of live video streams that are associated with the e-commerce platform 105.

In at least some embodiments, the commerce management engine 136 may determine, for selected viewers of live video streams, preferred product variants and offers of products that may be used to customize live video streams for individual viewers. For example, the commerce management engine 136 may determine discounts, sales, incentives, and the like, to offer to select viewers of a live video stream, based on account information for the e-commerce accounts associated with the viewers. The commerce management engine 136 may, in some embodiments, coordinate with the streaming media management engine 310 to control viewers' access to events, such as discounts, sales, etc. that may be offered as part of customized live video streams. Additionally, the commerce management engine 136 may manage connections between streaming/social network accounts of viewers and their e-commerce accounts.

The functionality described herein may be used in commerce to provide improved customer or buyer experiences. The e-commerce platform 105 could implement the functionality for any of a variety of different applications, examples of which are described herein. Although the streaming media management engine 310 of FIG. 1B is illustrated as a distinct component of the e-commerce platform 105, this is only an example. An engine could also or instead be provided by another component residing within or external to the e-commerce platform 105. In some embodiments, one or more applications that are associated with the e-commerce platform 105 may provide an engine that implements the functionality described herein to make it available to customers and/or to merchants. Furthermore, in some embodiments, the commerce management engine 136 may provide that engine. However, the location of the streaming media management engine 310 may be implementation specific. In some implementations, the streaming media management engine 310 may be provided at least in part by an e-commerce platform, either as a core function of the e-commerce platform or as an application or service supported by or communicating with the e-commerce platform. Alternatively, the streaming media management engine 310 may be implemented as a stand-alone service to clients such as a customer device or a merchant device. In addition, at least a portion of such an engine could be implemented in the merchant device and/or in the customer device. For example, a customer device could store and run an engine locally as a software application.

The streaming media management engine 310 is configured to implement at least some of the functionality described herein. Although the embodiments described below may be implemented in association with an e-commerce platform, such as (but not limited to) the e-commerce platform 105, the embodiments described below are not limited to e-commerce platforms.

In some embodiments, the streaming media management engine 310 may allow for associating a live video stream with e-commerce accounts that are associated with the e-commerce platform 105. For example, the streaming media management engine 310 may determine that a broadcaster of a live video stream is associated with a merchant of the e-commerce platform 105. The broadcaster may themselves be a merchant (e.g., a gamer selling gameplay-related merchandise, a social media influencer selling branded products, etc.), the broadcaster may specify a merchant for whom content is streamed (e.g., a social media influencer showcasing a product of a merchant sponsor), or a merchant can specify a broadcaster for whom approval is granted to feature their product in a live video stream. The streaming media management engine 310 may associate the live video stream with the merchant. As another example, the streaming media management engine 310 may determine that one or more viewers of a live video stream are associated with customer accounts on the e-commerce platform 105. The streaming media management engine 310 may associate the live video stream with e-commerce accounts of those customers that view the live video stream.

In at least some embodiments, the media generation module 314 cooperates with the commerce management engine 136 in generating overlay content for a live video stream. In particular, the media generation module 314 may obtain, via the commerce management engine 136, e-commerce account data for viewers of a live video stream and generate overlay content based on the account data for providing with personalized versions of the live video stream.

The data facility 134 may store data collected by the e-commerce platform 105 based on the interaction of merchants and customers with the e-commerce platform 105. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 105, may also be collected and stored in the data facility 134. Such customer data is obtained on the basis of inputs received via customer devices associated with the customers and/or prospective purchasers. By way of example, historical transaction events data including details of purchase transaction events by customers on the e-commerce platform 105 may be recorded and such transaction events data may be considered customer data. Such transaction events data may indicate product identifiers, date/time of purchase, final sale price, purchaser information (including geographical region of customer), and payment method details, among others. Other data vis-à-vis the use of e-commerce platform 105 by merchants and customers (or prospective purchasers) may be collected and stored in the data facility 134.

The data facility 134 may include customer preference data for customers of the e-commerce platform 105. For example, the data facility 134 may store account information, order history, browsing history, and the like, for each customer having an account associated with the e-commerce platform 105. The data facility 134 may additionally store, for a plurality of e-commerce accounts, wish list data and cart content data for one or more virtual shopping carts.

Figure 4:
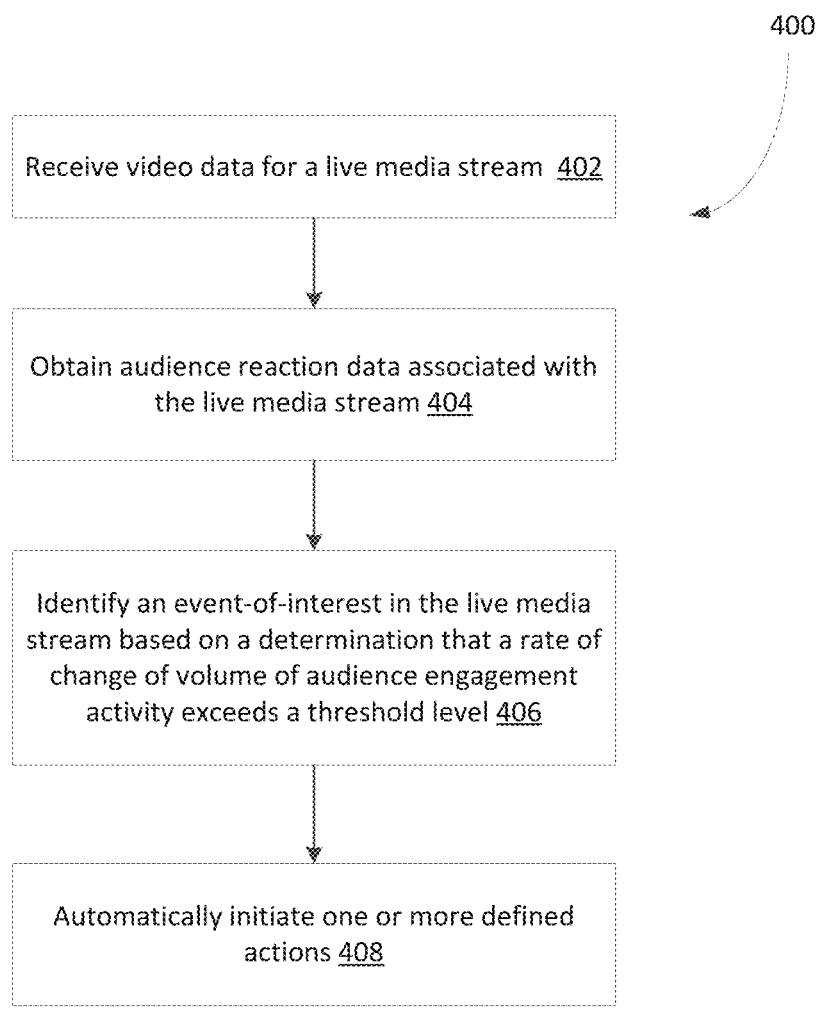
FIG. 4 shows, in flowchart form, an example method for processing audience reaction data associated with a live media stream.

Reference is now made to FIG. 4, which shows, in flowchart form, an example method 400 for processing audience reaction data associated with a live media stream. The method 400 may be performed by a computing system that implements media stream processing, such as the streaming media management engine 310 of FIG. 1A. As detailed above, the streaming media management engine may be a service that is provided within or external to an e-commerce platform to facilitate, among others, integration of live video streams with e-commerce activity.

In operation 402, the streaming media management engine receives video data of a live media stream. The live video stream may be transmitted by a computing device associated with a broadcaster. In some embodiments, the video data may be transmitted directly from the broadcaster device to the streaming media management engine. Alternatively, the streaming media management engine may receive the video data from a video broadcasting system, such as the servers of an online social network. The live video stream may be broadcast by a user of the social network, and the video data may be transmitted from the social network servers for delivery to viewer devices associated with other users of the social network.

The streaming media management engine receives the video data prior to delivery of the live video stream to viewers. That is, for one or more viewers of a live video stream, i.e., viewers that request to access a live video stream, the streaming media management engine may process the video data of the live video stream prior to delivery of the stream content to the viewers. In particular, the streaming media management engine is configured to receive and process original video data for a live video stream in real-time, and deliver modified video data to the viewers.

In operation 404, the streaming media management engine obtains, while the live media stream is being streamed, audience reaction data associated with the live media stream. The audience reaction data indicates, at least, an amount of audience engagement activity in connection with video content of the live media stream. Various different metrics may be used to gauge an amount of audience engagement activity such as, for example, number of viewer reactions (e.g., emoticons selected, typed responses, etc.), number of viewers watching, highest number of concurrent viewers, number of unique viewers, average amount of time (i.e., minutes, seconds) viewers spent watching the live stream, etc. In at least some embodiments, the streaming media management engine may determine that the audience reaction data is non-negative reaction data. That is, the audience reaction data may only include positive reactions (e.g., like, love, etc.).

In at least some embodiments, the audience reaction data may comprise user input obtained via viewer devices of viewers of the live media stream. For example, the user input may be at least one of text input or selection of defined user interface elements associated with the live media stream.

In operation 406, the streaming media management engine identifies an event-of-interest in the live media stream. The event-of-interest is identified based on a determination that a rate of change of the amount of audience engagement activity exceeds a threshold level. In at least some embodiments, the streaming media management engine may determine a baseline "velocity" of viewer engagement. Such "velocity" may represent, for example, an average value (or median, etc.) of a metric for amount of audience engagement over a defined period of time (e.g., 1-minute span of a live video stream). The rate of change in the amount may be monitored in order to detect for in-stream events that result in a substantial reaction by the viewing audience. That is, the event-of-interest may be an in-stream event that occurs immediately prior to a time of detecting acceleration in amount of audience engagement.

In some embodiments, the event-of-interest may be defined as an in-stream action that occurs within a predefined time window prior to the detected acceleration. For example, the event-of-interest may be an in-stream event having a start time that falls within a defined time window before the detected acceleration. In some embodiments, the event-of-interest may be defined as an event having a start time that corresponds to an inflection point in the rate of change in amount of audience engagement. For example, the event-of-interest may be an in-stream event having a start time that corresponds to the beginning of an acceleration in amount of audience engagement.

In at least some embodiments, the amount of audience engagement activity may be determined based on amount of user input, such as typed responses or activation of user interface elements, received via viewer devices.

In response to identifying the event-of-interest, the streaming media management engine automatically initiates one or more defined actions, in operation 408. For example, in some embodiments, the streaming media management engine may generate an offer of a product discount in connection with a defined product. The offer may be generated based on determining that the event-of-interest relates to a defined product. The generated offer may be provided to at least a subset of viewers of the live media stream. For example, the generated offer may be provided to one or more active participants (e.g., viewers that provided reactions) of the live video stream. In some embodiments, the streaming media management engine may provide digital assets in connection with the live media stream to viewers of the live media stream and/or the broadcaster associated with the live media stream. For example, the streaming media management engine may provide stream-related rewards (e.g., badges) to select viewers.

Figure 5:
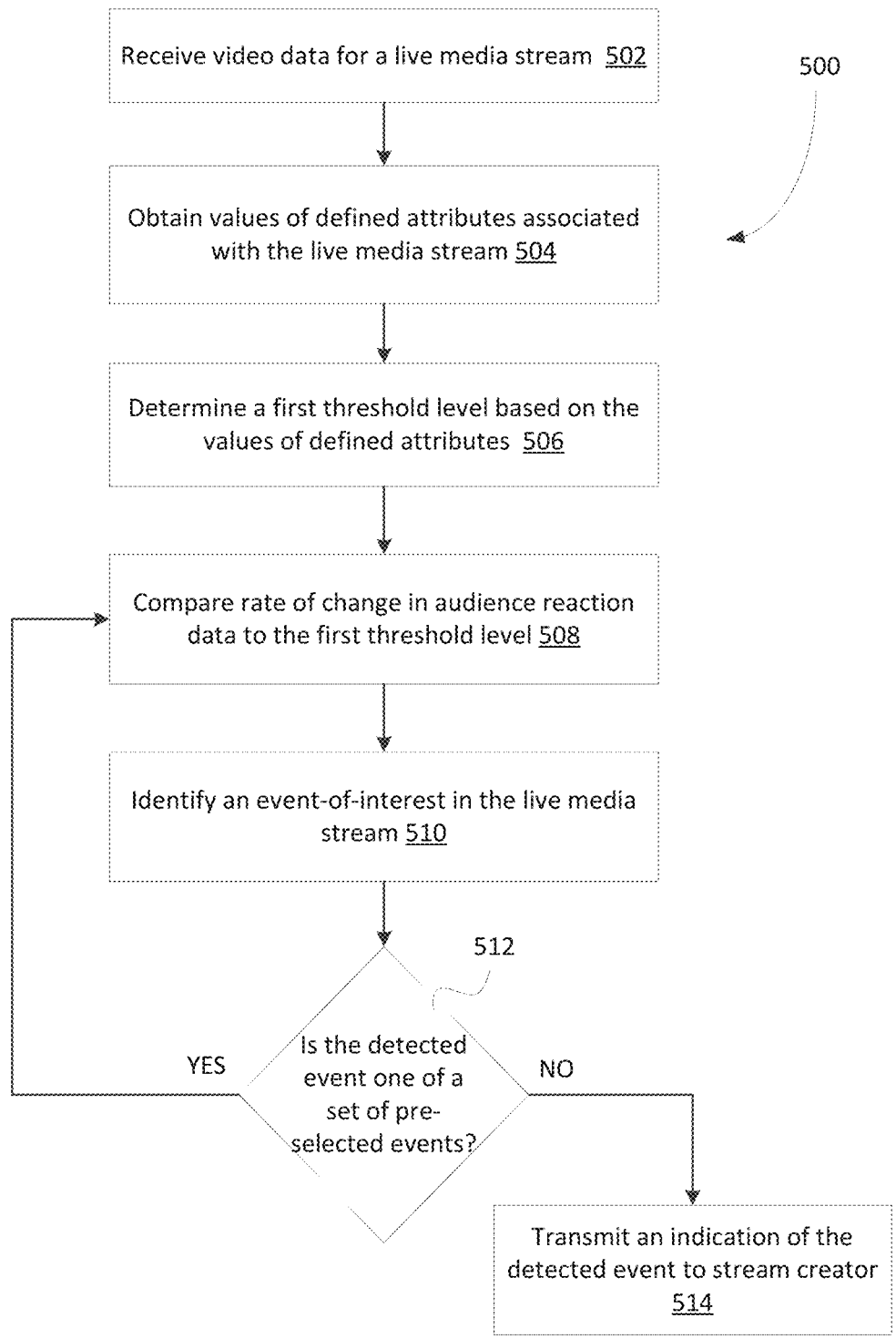
FIG. 5 shows, in flowchart form, an example method for notifying a broadcaster of events-of-interest in a live media stream.

Reference is now made to FIG. 5, which shows, in flowchart form, an example method 500 for detecting and notifying a broadcaster of events-of-interest in a live media stream. The method 500 may be performed by a computing system that implements media stream processing, such as the streaming media management engine 310 of FIG. 1A. The operations of method 500 may be performed in addition to, or as alternatives of, one or more of the operations of method 400.

In operation 502, the streaming media management engine receives video data for a live media stream. In operation 504, the streaming media management engine obtains values of defined attributes associated with the live media stream. In particular, the attributes may relate to amount of audience engagement, or reactions, to content of the live media stream. The reactions may, for example, include emotional reactions (e.g., like, love, etc.) and comments (and more generally, typed responses) to the live media stream.

In operation 506, the streaming media management engine determines a first threshold level based on the values of defined attributes. The threshold level represents a value that one or more current values of the defined attributes will be compared to in determining whether an event-of-interest has transpired in the live media stream. The definition of the threshold level may depend on several factors, such as a category of the stream and historical changes in second-order values of audience engagement metrics.

In operation 508, the streaming media management engine compares a rate of change in audience reaction data to the first threshold level. That is, the streaming media management engine may compare the acceleration in reactions, such as positive emotional reactions, associated with the live media stream to the first threshold level. An acceleration in positive reactions that goes beyond a known threshold may, for example, represent an anchored engagement by the audience of the live media stream to an event-of-interest.

In operation 510, the streaming media management engine identifies an event-of-interest in the live media stream based on the comparison. In particular, the streaming media management engine determines whether the acceleration of positive reactions to the live media stream exceeds the first threshold level. If the acceleration does exceed the first threshold level, it may be determined that an event-of-interest has occurred in the live media stream.

If, in operation 512, the streaming media management engine determines that the detected event-of-interest if one of a set of pre-selected events, the streaming media management engine returns to monitoring audience reaction data and comparing relevant metrics to defined thresholds (operation 508). Traditionally, events-of-interest are pre-selected by the broadcaster and may even be staged or scripted to evoke certain reaction from the audience. If the identified event-of-interest is such pre-selected event, no action may be taken by the streaming media management engine or the broadcaster.

If, on the other hand, the detected event-of-interest is not one of the pre-selected events, the streaming media management engine may transmit an indication of the detected event to the broadcaster, in operation 514. The streaming media management engine thus allows for capturing events-of-interest beyond those that are predicted or known in advance by the broadcaster.

Figure 6:
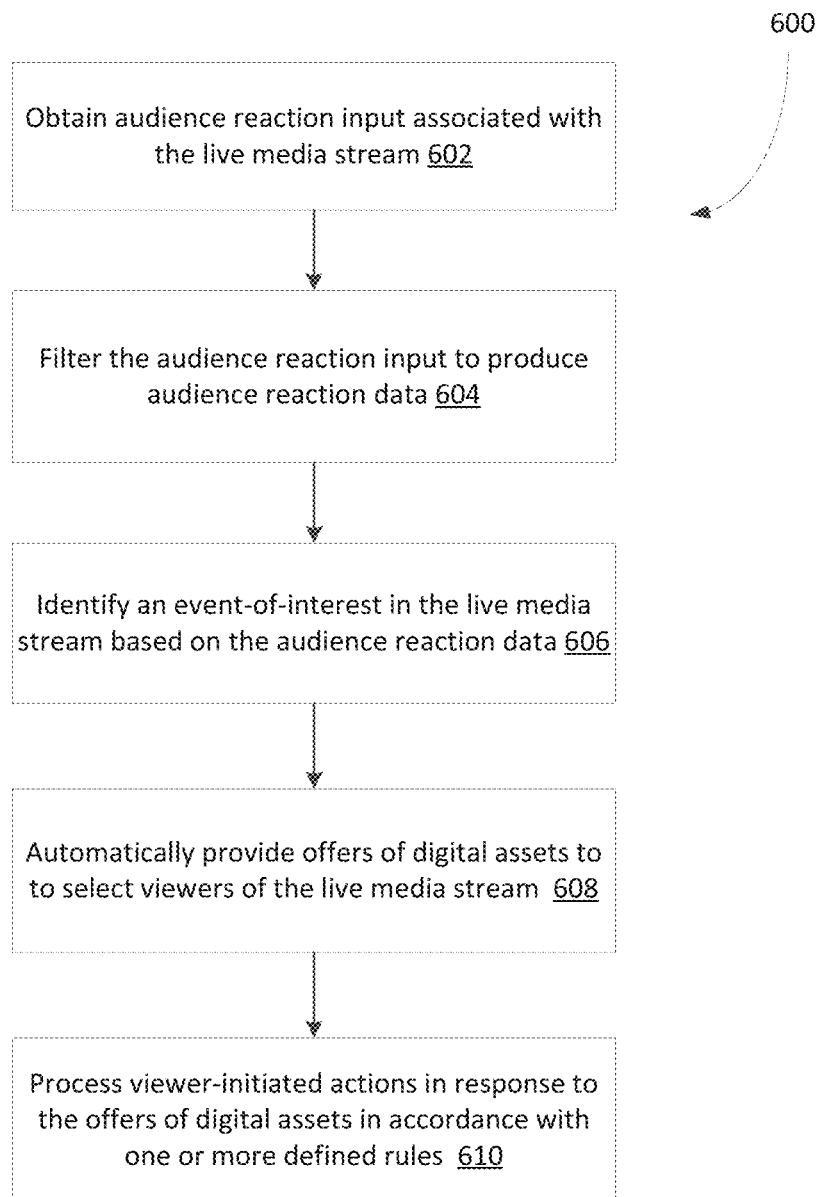
FIG. 6 shows, in flowchart form, an example method for selectively providing offers of digital assets to viewers of a live media stream.

Reference is now made to FIG. 6, which shows, in flowchart form, an example method 600 for selectively providing offers of digital assets to viewers of a live media stream. For example, in the context of e-commerce, broadcasters may be able to identify certain points in time when offers relating to products (e.g., discounts, sales, etc.) should be provided to a select subset of the viewers of the live media stream, in accordance with method 600. The method 600 may be performed by a computing system that implements media stream processing, such as the streaming media management engine 310 of FIG. 1A. The operations of method 600 may be performed in addition to, or as alternatives of, one or more of the operations of methods 400 and 500.

In operation 602, the streaming media management engine obtains audience reaction input associated with a live media stream. The audience reaction input may comprise, for example, typed text, selection of user interfaces (e.g., likes, emoticons), and uttered speech. In operation 604, the streaming media management engine filters the audience reaction input to produce audience reaction data. In particular, the streaming media management engine may filter the audience reaction input to exclude negative audience reaction input to produce the audience reaction data.

In at least some embodiments, negative audience reaction may include reactions that are not desired to be counted as forming part of the totality of audience reactions. In tracking audience reactions, it is desirable to detect activity that may be deemed as spam or otherwise skewing the analytics associated with the audience engagement. For example, actions that are designed to trigger certain incentives for viewers, such as continuous or repetitive clicking to trigger offers of discounts, may skew the audience engagement data. Such known activity may be filtered by, for example, detecting a frequency of viewer engagements, or by looking at the rates of engagement that a viewer (or associated e-commerce account) undertakes.

In operation 606, the streaming media management engine identifies an event-of-interest in the live media stream based on the filtered audience reaction data. The amount of audience engagement activity may be determined from the audience reaction data. In operation 608, the streaming media management engine automatically provides offers of digital assets to select viewers of the live media stream. For example, offers of discounts or sales may be automatically provided to a defined number of viewers of the live media stream or those viewers that perform certain actions to expressly claim the offers.

In operation 610, the streaming media management engine processes viewer-initiated actions in response to the offers of digital assets in accordance with one or more defined rules. For example, an offer of a discount, sale, etc. may be provided only during a specific time window. In some cases, the time window for claiming the offer/reward may be dynamically shifted to avoid predictable outcomes. In some embodiments, the streaming media management engine may prompt at least a subset of viewers of the live media stream for input in connection with the live media stream. The input may be a specific type of input (e.g., typed answer to a question) which may be used for determining whether to reject a viewer's claim to an offer. In some cases, the streaming media management engine may conduct secondary analytics to determine frequent participants and cross-genre cohorts to understand cluster data of stream consumption for audiences, and leverage the data to offer "tickets" that may be used to access specific rewards, discounts, sales, etc.

Figure 7:
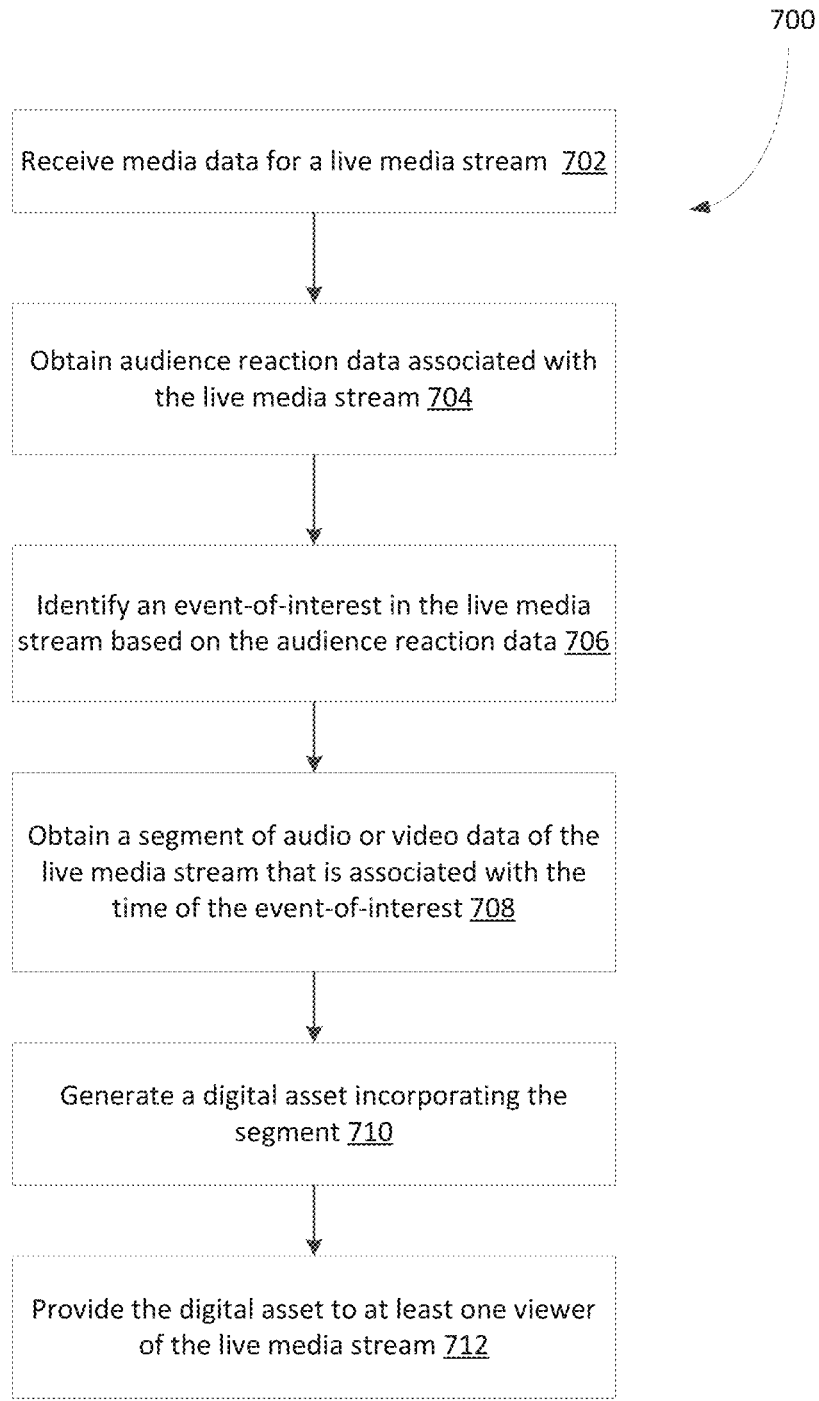
FIG. 7 shows, in flowchart form, an example method for generating a digital asset incorporating data of a live media stream.

Reference is now made to FIG. 7, which shows, in flowchart form, an example method 700 for generating a digital asset incorporating media data of a live media stream. The method 700 may be performed by a computing system that implements media stream processing, such as the streaming media management engine 310 of FIG. 1A.

In operation 702, the streaming media management engine receives media data of a live media stream. In operation 704, the streaming media management engine obtains audience reaction data associated with the live media stream. Operations 702 and 704 may be performed in a similar manner as operations 402 and 404 of method 400.

In operation 706, the streaming media management engine identifies an event-of-interest in the live media stream based on the audience reaction data. The time associated with the event-of-interest is prior to the time associated with the audience reaction data, i.e., the audience reaction is subsequent to the event-of-interest.

In operation 708, the streaming media management engine obtains a segment of at least one of audio data or video data of the live media stream that is associated with the time of the event-of-interest. The time associated with a detected event-of-interest may refer to a start time, an end time, or a defined time window for the event-of-interest. In at least some embodiments, the segment may include at least one of audio capture data or video frame capture data from the media data that is associated with the time of the event-of-interest. For example, the segment may comprise a video frame (i.e., image) or video clip from video data that is associated with the time of the event-of-interest.

In operation 710, the streaming media management engine generates a digital asset incorporating the segment. In some embodiments, the digital asset may comprise a product offer that includes a product having at least one of audio capture data or video frame capture data applied thereto. For example, the product may be one of an article of clothing, a household item, or a promotional item, and the digital asset may be an offer for such product having a printed image of a frame capture applied to the product.

In some embodiments, the digital asset may comprise an electronic product incorporating the at least one of audio capture data or video frame capture data. For example, the electronic product may be or include a customizable graphics interchange format (GIF) image. In some embodiments, the streaming media management engine may generate display data associated with the digital asset and provide the generated display data as overlay content for the live media stream.

In operation 712, the streaming media management engine provides the digital assets to at least one viewer of the live media stream. For example, the digital assets may be provided to a select subset of viewers that engaged with the live media stream (e.g., by means of user interface elements corresponding to emotional reactions, typed responses, etc.).

Figure 8:
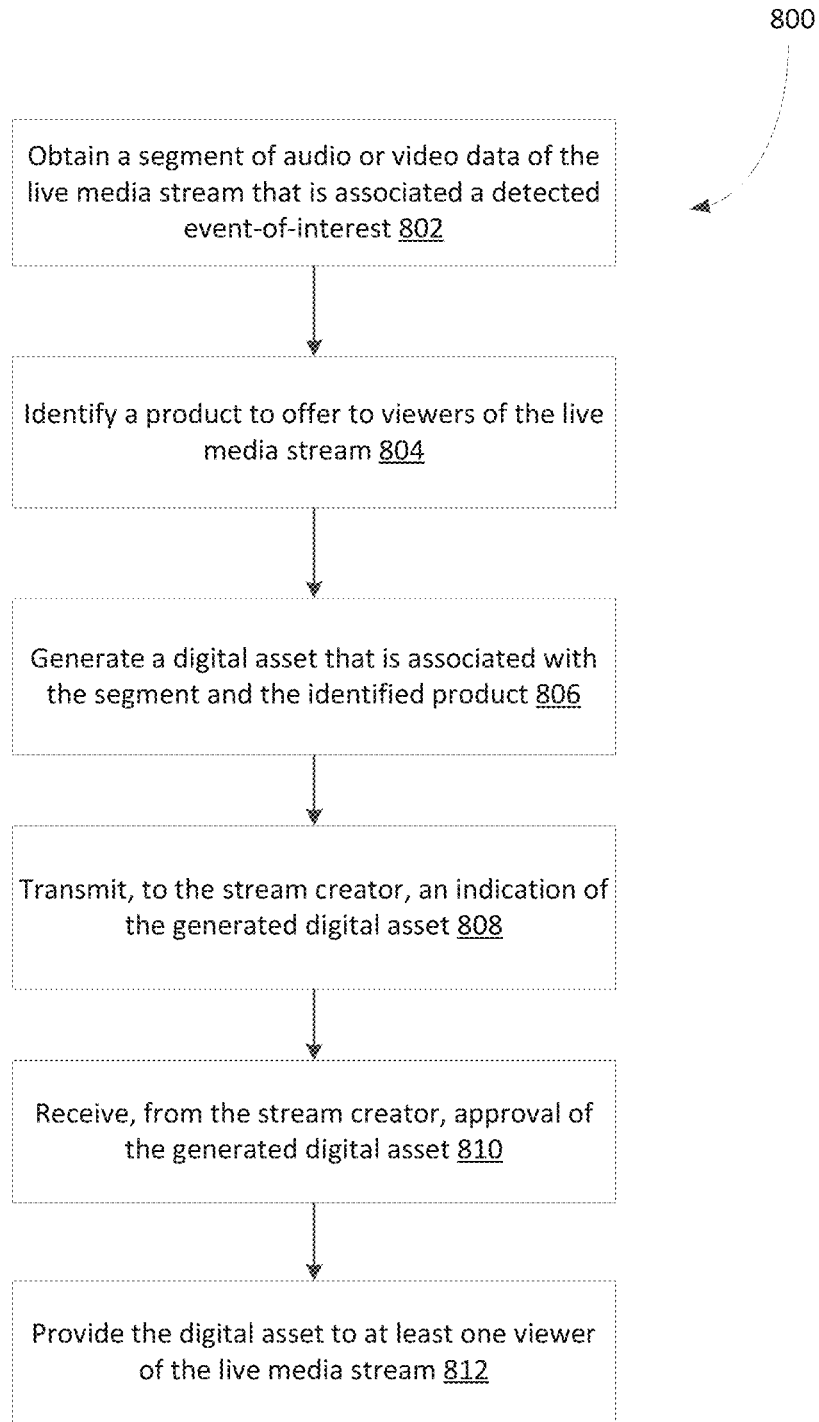
FIG. 8 shows, in flowchart form, an example method for obtaining approval of a broadcaster in connection with a generated digital asset.

Reference is now made to FIG. 8, which shows, in flowchart form, an example method 800 for obtaining approval of a broadcaster in connection with a generated digital asset. The method 800 may be performed by a computing system that implements media stream processing, such as the streaming media management engine 310 of FIG. 1A. The operations of method 800 may be performed in addition to, or as alternatives of, one or more of the operations of method 700.

In operation 802, the streaming media management engine obtains a segment of audio data or video data of the live media stream that is associated with a detected event-of-interest. The event-of-interest may, for example, be an event that is associated with an acceleration in positive reactions to the live media stream, in accordance with example embodiments described above.

In operation 804, the streaming media management engine identifies a product to offer to viewers of the live media stream. The product may be one of a set of merchandise that is pre-selected by a merchant associated with the live media stream. For example, the product may be an article of clothing, a household item, or a promotional item.

In operation 806, the streaming media management engine generates a digital asset that is associated with the segment and the identified product. For example, the digital asset may be an offer of a discount or sale for merchandise featuring a graphical representation (e.g., screenshot) of a captured video frame. In some embodiments, the merchandise may be treated by one or more filters to change the characteristics of the graphical representation (e.g., cartoonizing, de-colorizing, badging, etc.).

In operation 808, the streaming media management engine transmits, to the broadcaster, an indication of the generated digital asset. In some embodiments, the streaming media management engine may prompt the broadcaster to approve the digital asset prior to providing the digital asset to viewers of the live media stream. For example, the broadcaster may be requested to confirm the offer of the generated digital assets to select viewers of the live media stream.

In operation 810, the streaming media management engine receives, from the broadcaster, approval of the generated digital asset and in response, the streaming media management engine provides the digital asset to at least one viewer of the live media stream, in operation 812.

Figure 9:
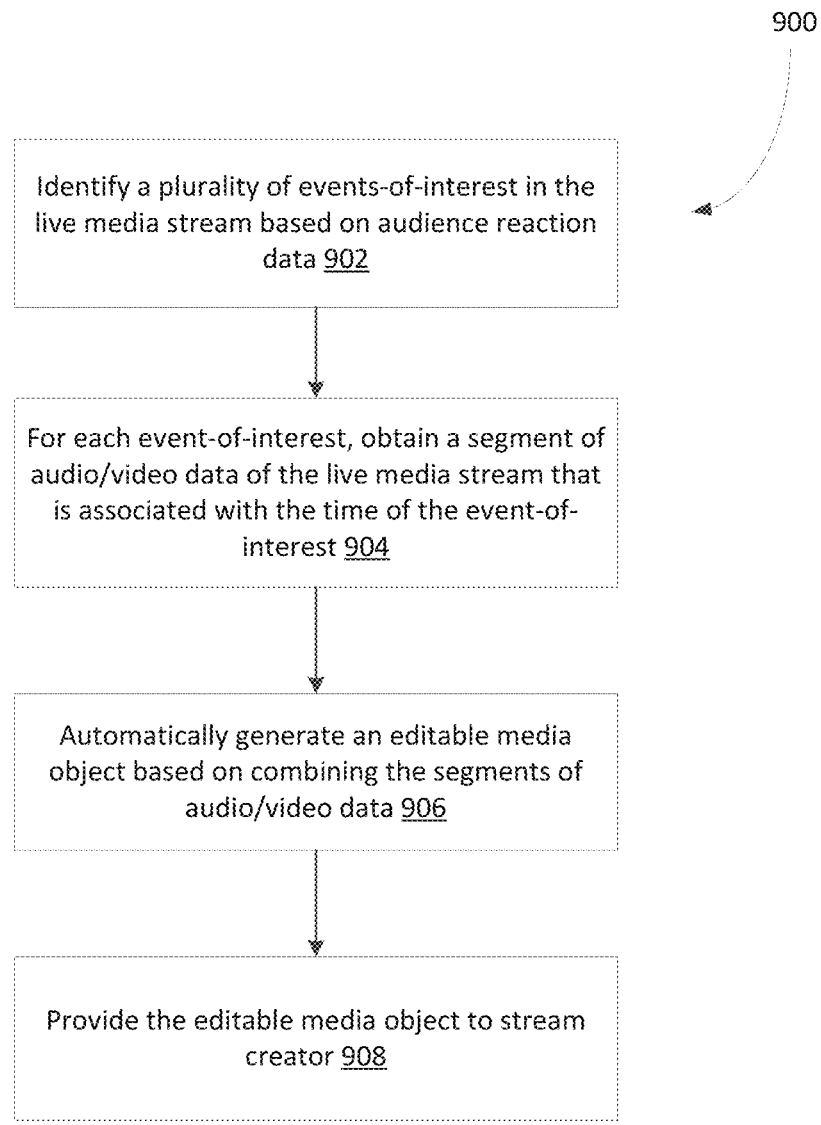
FIG. 9 shows, in flowchart form, an example method for generating an editable media object based on data associated with a plurality of events-of-interest in a live media stream.

Reference is now made to FIG. 9, which shows, in flowchart form, an example method 900 for generating an editable media object based on data associated with a plurality of events-of-interest in a live media stream. The method 900 may be performed by a computing system that implements media stream processing, such as the streaming media management engine 310 of FIG. 1A. The operations of method 900 may be performed in addition to, or as alternatives of, one or more of the operations of methods 700 and 800.

In operation 902, the streaming media management engine identifies a plurality of events-of-interest in a live media stream based on audience reaction data. The plurality of events-of-interest may, for example, be those events in the live media stream that are associated with accelerations in positive reactions exceeding defined threshold levels for the stream. Such events-of-interest may be considered to be highlights of the live media stream. Each of the plurality of events-of-interest may be associated with different times (e.g., start time, end time, or time window) during the live media stream.

For each of the identified events-of-interest, the streaming media management engine obtains a segment of audio and/or video data of the live media stream that is associated with the time of the event-of-interest, in operation 904. For example, one or more video frames, audio files, and/or video clips that are associated with the events-of-interest may be obtained.

In operation 906, the streaming media management engine automatically generates an editable media object based on combining the segments of audio and/or video data. In some embodiments, the streaming media management engine may stitch the captured segments associated with the events-of-interest to generate a single video-on-demand (e.g., a "highlights" video). The segments may, for example, be stitched together in a chronological order based on the associated times of the segments. The editable media object may then be provided to the broadcaster, in operation 908.

Figure 10:
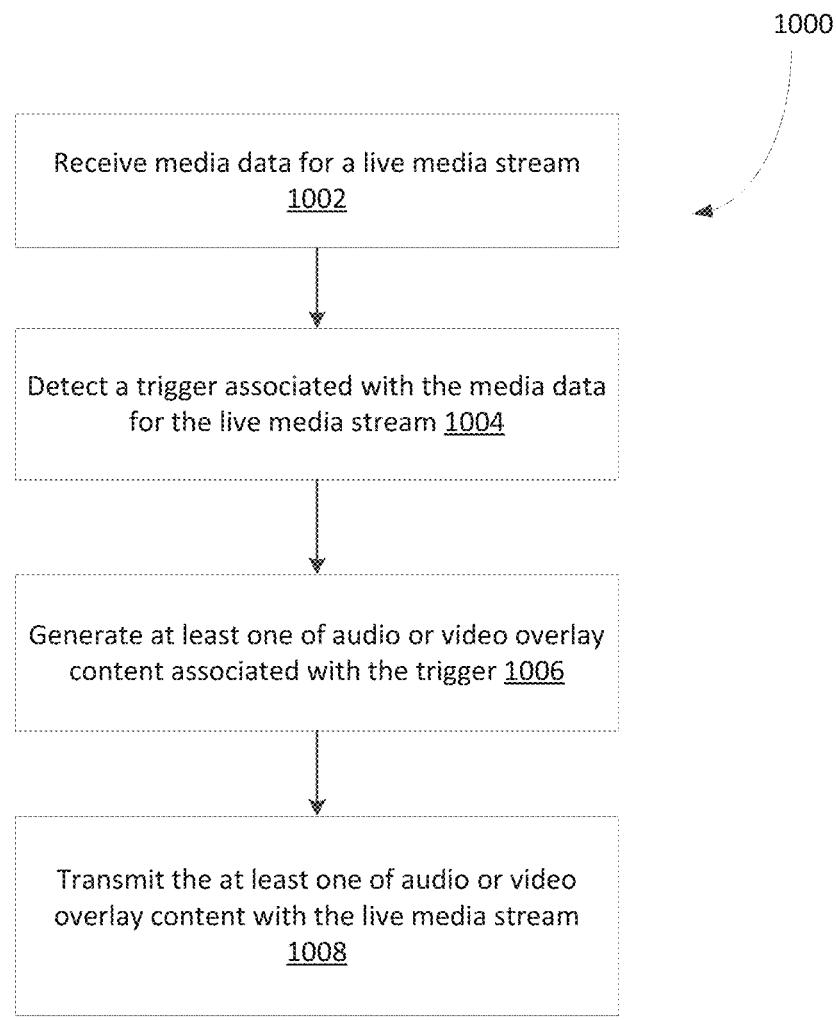
FIG. 10 shows, in flowchart form, an example method for providing modified media data of a live media stream based on detecting a broadcaster-initiated trigger action.

Reference is now made to FIG. 10, which shows, in flowchart form, an example method 1000 for providing modified media data of a live media stream based on detecting a broadcaster-initiated trigger action. The method 1000 may be performed by a computing system that implements media stream processing, such as the streaming media management engine 310 of FIG. 1A.

In operation 1002, the streaming media management engine receives media (e.g., audio, video, etc.) data for a live media stream. In operation 1004, the streaming media management engine detects a trigger associated with the media data for the live media stream. Various triggers that are initiated by the broadcaster may be associated with automated actions that can be performed in connection with the live media stream.

In at least some embodiments, detecting a trigger associated with the media data may include detecting one or more defined keywords in audio data of the live media stream. The streaming media management engine may first determine the one or more defined keywords to detect in audio data processed by the streaming media management engine. In some embodiments, the streaming media management engine may retrieve, from memory associated with the e-commerce platform, broadcaster-specified keyword data identifying the one or more defined keywords.

Additionally, or alternatively, the streaming media management engine may determine the defined keywords based on previous media streams involving the broadcaster. In particular, the streaming media management engine may detect, during the previous media streams, a greater-than-threshold acceleration of audience reaction during display of a media stream. The streaming media management engine identifies a trigger time within the media stream associated with the greater-than-threshold acceleration of audience reaction, and identifies utterance of the one or more defined keywords at the trigger time.

In some embodiments, detecting the trigger associated with the media data may include detecting a defined gesture in video data of the live media stream. For example, the streaming media management engine may perform real-time gesture recognition (e.g., hand gestures) to identify one of a set of gestures that are defined by the broadcaster as being associated with automated actions in connection with the live media stream.

In response to detecting the trigger, the streaming media management engine generates at least one of audio or video overlay content associated with the trigger, in operation 1006. The overlay content may, in some embodiments, include an offer/offer(s) of one or more digital assets that can be transmitted with the live video stream. The digital asset may, for example, be a graphical representation of a digital coupon, ticket, etc. for accessing a discount or sale associated with a certain product. In operation 1008, the streaming media management engine transmits, to one or more viewer devices, the at least one of audio or video overlay content with the live media stream.

In some embodiments, detecting the trigger associated with the media data may include detecting that the content of the live media stream relates to a particular product. For example, the streaming media management engine may determine that the content of the stream relates to a particular product if the stream is associated with a product tag (e.g., hash tag) corresponding to the particular product. As another example, the streaming media management engine may determine that the content of the stream relates to a particular product upon detecting the product in video data of the live media stream.

Figure 11:
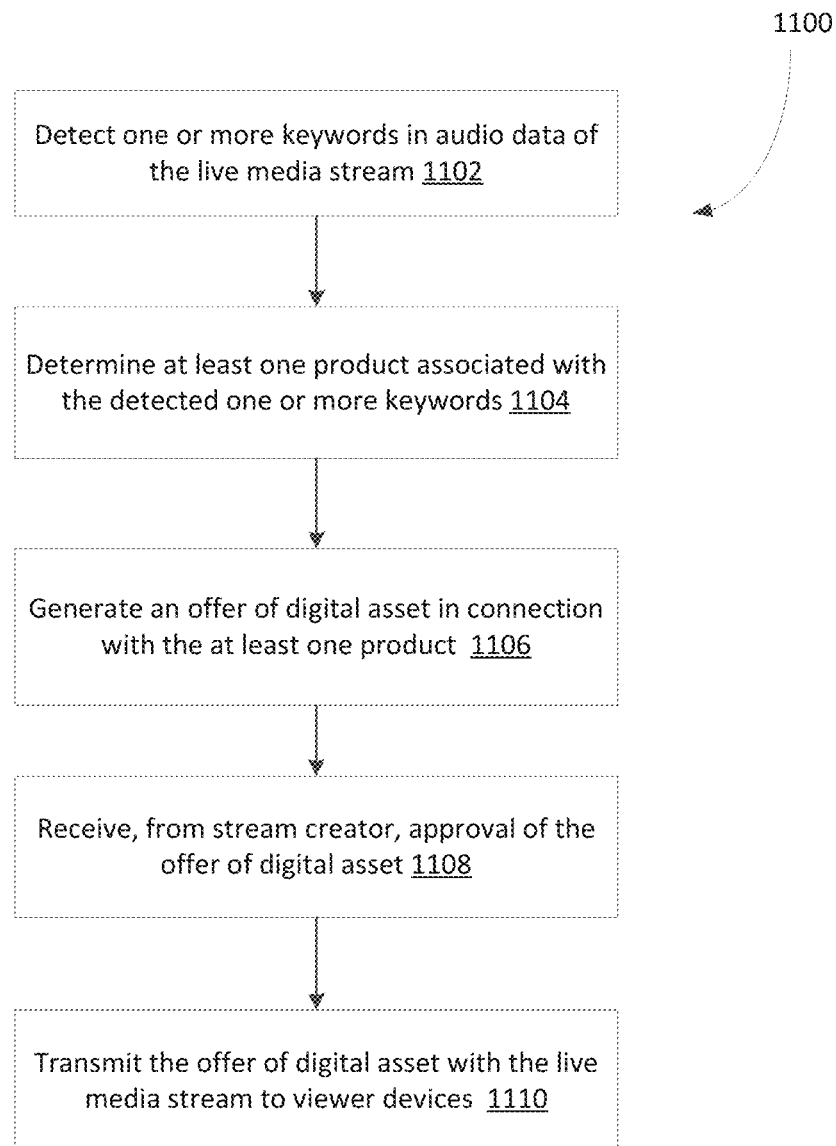
FIG. 11 shows, in flowchart form, an example method for providing offers of digital assets with a live media stream.

Reference is now made to FIG. 11, which shows, in flowchart form, an example method 1100 for providing offers of digital assets with a live media stream. The method 1100 may be performed by a computing system that implements media stream processing, such as the streaming media management engine 310 of FIG. 1A. The operations of method 1100 may be performed in addition to, or as alternatives of, one or more of the operations of method 1000.

In operation 1102, the streaming media management engine detects one or more keywords in audio data of the live media stream. For example, the streaming media management engine may analyze speech of the broadcaster to determine whether one or more defined keywords are uttered by the broadcaster in the live media stream.

In operation 1104, the streaming media management engine determines at least one product associated with the detected one or more keywords. The product may be determined based on, for example, a defined mapping of broadcaster-specified keywords to a set of merchandise that is desired to be offered to select viewers of the live media stream.

In operation 1106, the streaming media management engine generates an offer of digital asset in connection with the at least one product. The offer may be provided to the broadcaster for consideration and approval, prior to distribution to one or more viewers of the live media stream. In operation 1108, the streaming media management engine receives, from the broadcaster, approval of the offer of digital asset. The offer of digital asset may then be transmitted with the live media stream to viewer devices, in operation 1110.

Figure 12:
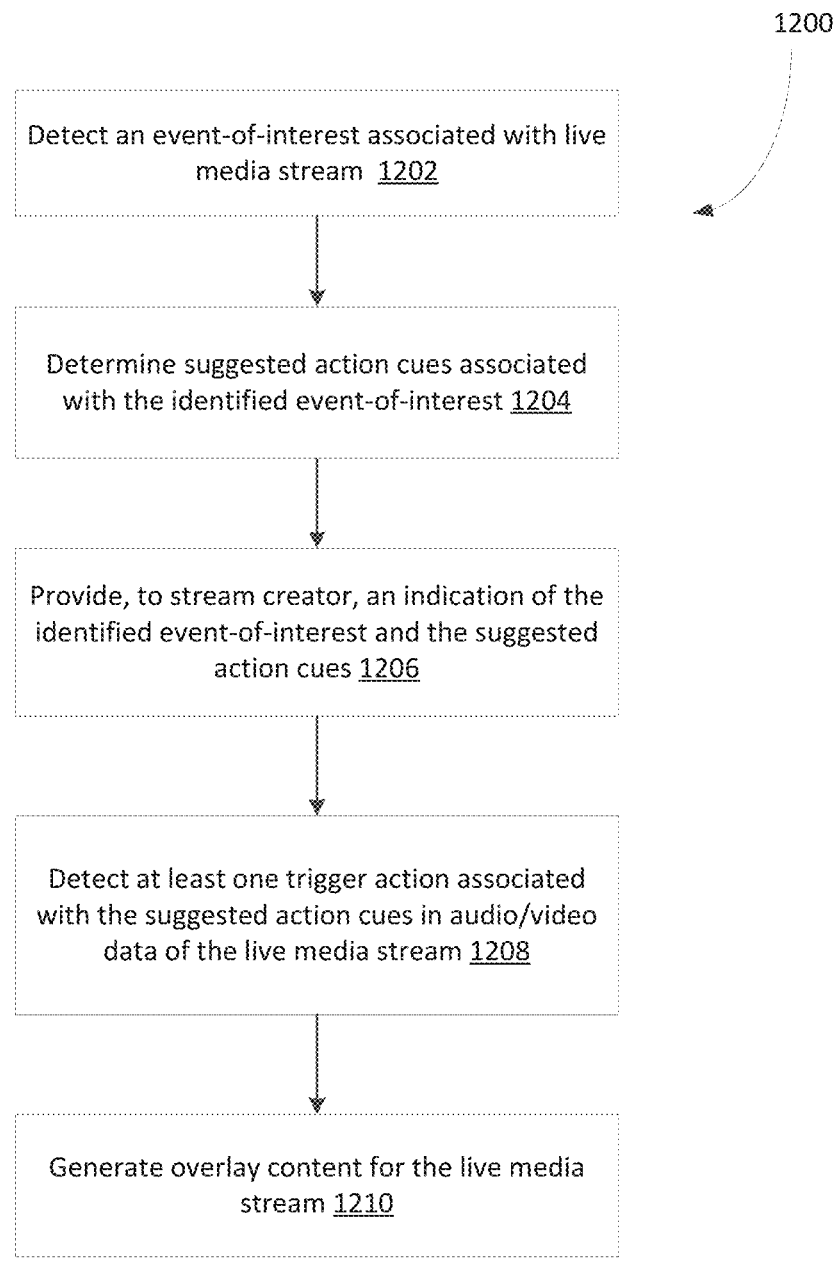
FIG. 12 shows, in flowchart form, an example method for providing suggested actions to a broadcaster in connection with a live media stream.

Reference is now made to FIG. 12, which shows, in flowchart form, an example method 1200 for providing suggested actions to a broadcaster in connection with a live media stream. The method 1200 may be performed by a computing system that implements media stream processing, such as the streaming media management engine 310 of FIG. 1A. The operations of method 1200 may be performed in addition to, or as alternatives of, one or more of the operations of methods 1000 and 1100.

In operation 1202, the streaming media management engine detects an event-of-interest associated with a live media stream. In some embodiments, the event-of-interest may be detected based on audience reaction data associated with the live media stream. For example, the event-of-interest may be an in-stream event that occurs immediately prior to detecting an acceleration in amount of viewer engagement.

In operation 1204, the streaming media management engine determines suggested action cues associated with the identified event-of-interest. The action cues represent guides for the broadcaster during the live media stream to provide confirmation for one or more automated actions in connection with the live media stream. The action cues may, for example, be keywords that are associated with the event-of-interest, the live media stream, and/or one or more automated actions.

In operation 1206, the streaming media management engine provides, to the broadcaster, an indication of the identified event-of-interest and the suggested action cues associated with the event-of-interest. For example, the indication may be provided via a graphical user interface of a media streaming application (or another application, user interface, etc.) that the broadcaster uses for their live media stream.

In operation 1208, the streaming media management engine detects at least one trigger action associated with the suggested action cues in audio and/or video data of the live media stream. For example, the streaming media management engine may detect at least one of the suggested keywords associated with the identified event-of-interest in audio data of the live media stream. The suggested keywords may, for example, be identified from uttered speech of the broadcaster in the audio data.

In operation 1210, the streaming media management engine generates overlay content for the live media stream. The overlay content may correspond to an automated action for which the detection of the trigger action serves as confirmation. For example, the overlay content may be a graphical representation of a digital asset associated with a product that is offered for sale to one or more viewers of the live media stream.

Example E-Commerce Platform

Although not required, in some embodiments, the methods disclosed herein may be performed on or in association with an e-commerce platform. An example of an e-commerce platform will now be described.

Figure 2:
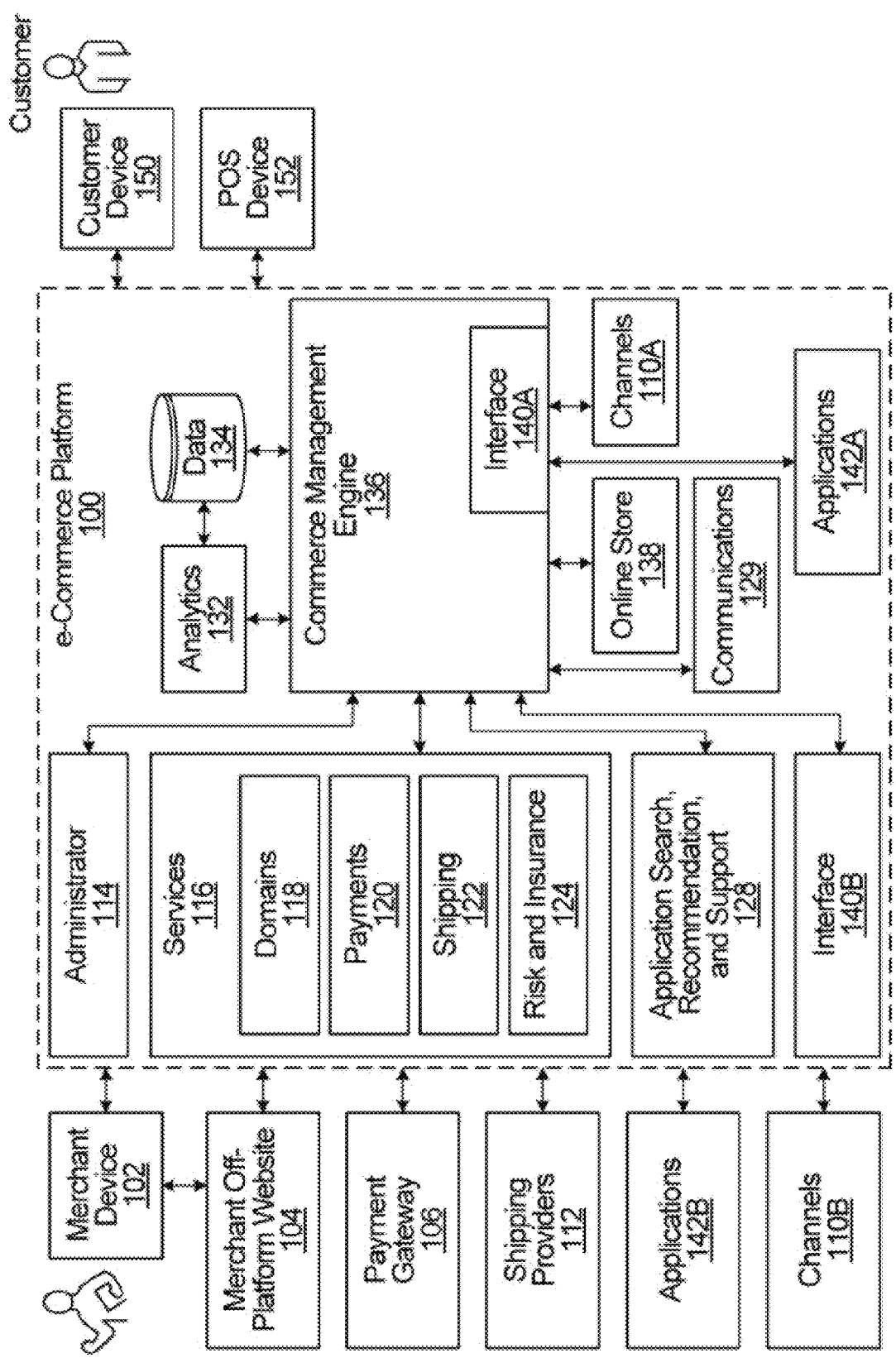
FIG. 2 is a block diagram of an e-commerce platform, in accordance with an example embodiment.

FIG. 2 illustrates an example e-commerce platform 100, according to one embodiment. The e-commerce platform 100 may be exemplary of the e-commerce platform 105 described with reference to FIG. 1B. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, additionally or alternatively, be provided by one or more providers/entities.

In the example of FIG. 2, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other Internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure, the terms online store and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network 420 connected to the e-commerce platform 100. For example, the online store 138 may serve or send content in response to requests for data 134 from the customer device 150, where a browser (or other application) connects to the online store 138 through a network 420 using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 3 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 3. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 2, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
receiving video data of a live media stream;
obtaining, while the live media stream is being streamed, audience reaction data associated with the live media stream, the audience reaction data indicating, at least, an amount of audience engagement activity in connection with video content of the live media stream;
identifying an event-of-interest in the live media stream based on a determination that a rate of change in value of a metric for the amount of audience engagement activity exceeds a threshold level, the rate of change in value of the metric indicating an acceleration in positive reactions; and
in response to identifying the event-of-interest, providing one or more digital assets in connection with the live media stream to a subset of viewers that provided reactions for the live media stream.

2. The method of claim 1, wherein the audience reaction data comprises user input obtained via computing devices associated with viewers of the live media stream.

3. The method of claim 2, wherein the user input comprises at least one of text input or selection of defined user interface elements associated with the live media stream.

4. The method of claim 2, wherein the amount of audience engagement activity is determined based on a quantity of the user input.

5. The method of claim 1, wherein obtaining audience reaction data includes determining that the audience reaction data is non-negative reaction data.

6. The method of claim 1, wherein obtaining audience reaction data comprises:
receiving audience reaction input;
filtering the audience reaction input to exclude negative audience reaction input to produce the audience reaction data; and
determining the amount of audience engagement activity from the audience reaction data.

7. The method of claim 1, further comprising providing one or more digital assets in connection with the live media stream to a stream creator associated with the live media stream.

8. The method of claim 1, further comprising, in response to identifying the event-of-interest, prompting at least a subset of viewers of the live media stream for input in connection with the live media stream.

9. The method of claim 1, wherein providing the one or more digital assets comprises:
generating an offer of a product discount in connection with a defined product; and
providing the generated offer to at least a subset of viewers of the live media stream.

10. The method of claim 9, wherein generating an offer further comprises determining that the event-of-interest relates to the defined product.

11. A computing system, comprising:
a processor;
a memory storing computer-executable instructions that, when executed by the processor, are to cause the processor to:
receive video data of a live media stream;
obtain, while the live media stream is being streamed, audience reaction data associated with the live media stream, the audience reaction data indicating, at least, an amount of audience engagement activity in connection with video content of the live media stream;
identify an event-of-interest in the live media stream based on a determination that a rate of change in value of a metric for the amount of audience engagement activity exceeds a threshold level, the rate of change in value of the metric indicating an acceleration in positive reactions; and
in response to identifying the event-of-interest, provide one or more digital assets in connection with the live media stream to a subset of viewers that provided reactions for the live media stream.

12. The computing system of claim 11, wherein the audience reaction data comprises user input obtained via computing devices associated with viewers of the live media stream.

13. The computing system of claim 12, wherein the user input comprises at least one of text input or selection of defined user interface elements associated with the live media stream.

14. The computing system of claim 12, wherein the amount of audience engagement activity is determined based on a quantity of the user input.

15. The computing system of claim 11, wherein obtaining audience reaction data includes determining that the audience reaction data is non-negative reaction data.

16. The computing system of claim 11, wherein obtaining audience reaction data comprises:
receiving audience reaction input;
filtering the audience reaction input to exclude negative audience reaction input to produce the audience reaction data; and
determining the amount of audience engagement activity from the audience reaction data.

17. The computing system of claim 11, wherein the instructions, when executed, are to further cause the processor to provide one or more digital assets in connection with the live media stream to a stream creator associated with the live media stream.

18. The computing system of claim 11, wherein providing the one or more digital actions comprises:
   generating an offer of a product discount in connection with a defined product; and
   providing the generated offer to at least a subset of viewers of the live media stream.

19. The computing system of claim 18, wherein generating an offer further comprises determining that the event-of-interest relates to the defined product.

20. A non-transitory, computer-readable medium storing computer-executable instructions that, when executed by a processor, are to cause the processor to:
   receive video data of a live media stream;
   obtain, while the live media stream is being streamed, audience reaction data associated with the live media stream, the audience reaction data indicating, at least, an amount of audience engagement activity in connection with video content of the live media stream;
   identify an event-of-interest in the live media stream based on a determination that a rate of change in value of a metric for the amount of audience engagement activity exceeds a threshold level, the rate of change in value of the metric indicating an acceleration in positive reactions; and
   in response to identifying the event-of-interest, provide one or more digital assets in connection with the live media stream to a subset of viewers that provided reactions for the live media stream.

* * * * *